(12) United States Patent
Bowlin

(10) Patent No.: US 7,010,636 B1
(45) Date of Patent: Mar. 7, 2006

(54) METHOD AND APPARATUS FOR RAPID DATA TRANSFER BETWEEN DIS-SIMILAR DEVICES

(75) Inventor: Stan W. Bowlin, Colorado Springs, CO (US)

(73) Assignee: Fluke Networks, Inc., Everett, WA (US)

( * ) Notice: Subject to any disclaimer, the term of this patent is extended or adjusted under 35 U.S.C. 154(b) by 941 days.

(21) Appl. No.: 09/675,974

(22) Filed: Sep. 29, 2000

(51) Int. Cl.
  *G06F 13/14* (2006.01)
  *G06F 12/00* (2006.01)

(52) U.S. Cl. ................................ 710/305; 711/118

(58) Field of Classification Search ......... 710/305, 710/59; 711/140; 370/230; 33/503; 326/38; 714/25, 27, 28
See application file for complete search history.

(56) References Cited

U.S. PATENT DOCUMENTS

| | | | |
|---|---|---|---|
| 4,309,755 A | | 1/1982 | Lanty |
| 4,368,461 A | | 1/1983 | Komatsu et al. |
| 5,073,851 A | * | 12/1991 | Masterson et al. .......... 711/140 |
| 5,379,289 A | * | 1/1995 | DeSouza et al. ............ 370/230 |
| 5,566,350 A | | 10/1996 | Takagi et al. |
| 6,219,928 B1 | * | 4/2001 | Raab et al. .................... 33/503 |
| 6,326,806 B1 | * | 12/2001 | Fallside et al. ............... 326/38 |
| 6,499,079 B1 | * | 12/2002 | Gulick ....................... 710/305 |

OTHER PUBLICATIONS

TDB-ACC-No: NN79122651, "Circuit for Tracing Branch Instructions", Dec. 1979, IBM Technical Disclosure Bulletin, vol. 22, Issue No. 7, pp. 2651-2654.*

* cited by examiner

*Primary Examiner*—Rehana Perveen
*Assistant Examiner*—Christopher E. Lee
(74) *Attorney, Agent, or Firm*—Dellett & Walters

(57) ABSTRACT

A system for transferring data from one source to plural destination devices, employs timing and bus signal control to have one destination device treat the transfer as a read operation, while another destination device treats the transfer as a write operation.

6 Claims, 2 Drawing Sheets

METHOD AND APPARATUS FOR RAPID DATA TRANSFER BETWEEN DIS-SIMILAR DEVICES

BACKGROUND OF THE INVENTION

This invention relates to test instruments, and more particularly to a network test instrument.

In testing and analysis of networks, as network speeds increase, more efficient use of test instrument processing capabilities becomes important, to maximize analysis abilities and minimize hardware requirements. Therefore, it is desirable to move data on a bus only a single time, if possible. In network analysis instruments, various specialized processing chips may be employed, however, not all the desired devices in use in the instrument to which data may be destined behave similarly in receiving data. Thus, for example, at gigabit data transfer rates, there may not be sufficient time to employ multiple storing and retrieval of data to separate devices.

SUMMARY OF THE INVENTION

In accordance with the invention, a method and apparatus is provided to transfer data between dis-similar devices.

Accordingly, it is an object of the present invention to provide an improved apparatus for minimizing the time to retrieve and store data in external memory and internal processor memory.

It is a further object of the present invention to provide an improved apparatus that stores data from a media access controller simultaneously in memory and in a DSP microprocessor.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a network test instrument adapted to speed operations by providing data from one source to two destinations substantially simultaneously.

Figure 1:
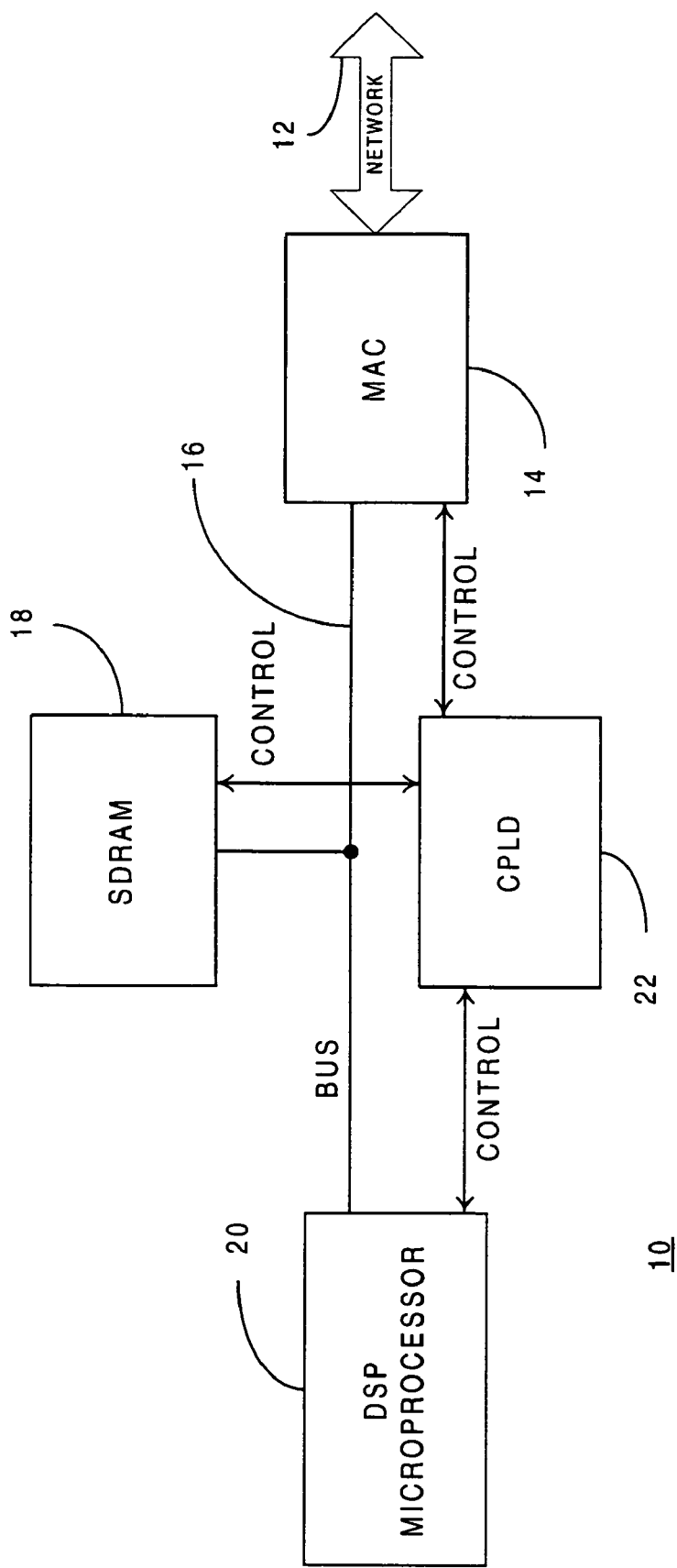
FIG. 1 is a block diagram of a network test instrument embodying the invention.

Referring to FIG. 1, a block diagram of a network test device 10, the device connects to a network 12 via a media access controller (MAC) 14. The MAC is connected via a bus 16 to memory 18 (suitably SDRAM) and a digital signal processor (DSP) microprocessor 20. A complex programmable logic device (CPLD) 22 communicates to each of the MAC 14, the memory 18 and the DSP 20, providing control.

In operation, traffic from the network is received via the media access controller 14. The media access controller is a first-in first-out (FIFO) device and does not provide addressed access to or output for the data it receives. On the other hand, both the SDRAM 18 and the DSP microprocessor 20 employ addressing schemes for storage of data.

Typically, in accordance with the prior art, data received from the MAC would be read by the DSP via the bus, and, if the data was to be stored, it would be written to the SDRAM via the bus by the DSP in a separate bus transfer operation. Therefore, the data would pass on the bus at least two separate times. In order to speed operations and not require that the microprocessor read the data from the media access controller and then, in a separate operation, write the data to memory, should it be decided that the data is to be stored in memory, in accordance with the present invention, when data is retrieved from the MAC, it is simultaneously written to a storage address in the SDRAM and into the DSP. Then, if the DSP determines that the data is to be saved, the address pointers to the memory are updated to select a next position in the memory for future data. However, if the DSP determines that the data is not to be stored in the memory, the address pointers are not updated, and instead remain set to the start point of the previous write to memory. That way, the next data that is provided from the MAC is written "over" the previous data that was not to be saved.

According to the invention, therefore, data received from the MAC need only pass the bus once, speeding operations.

Figure 2:
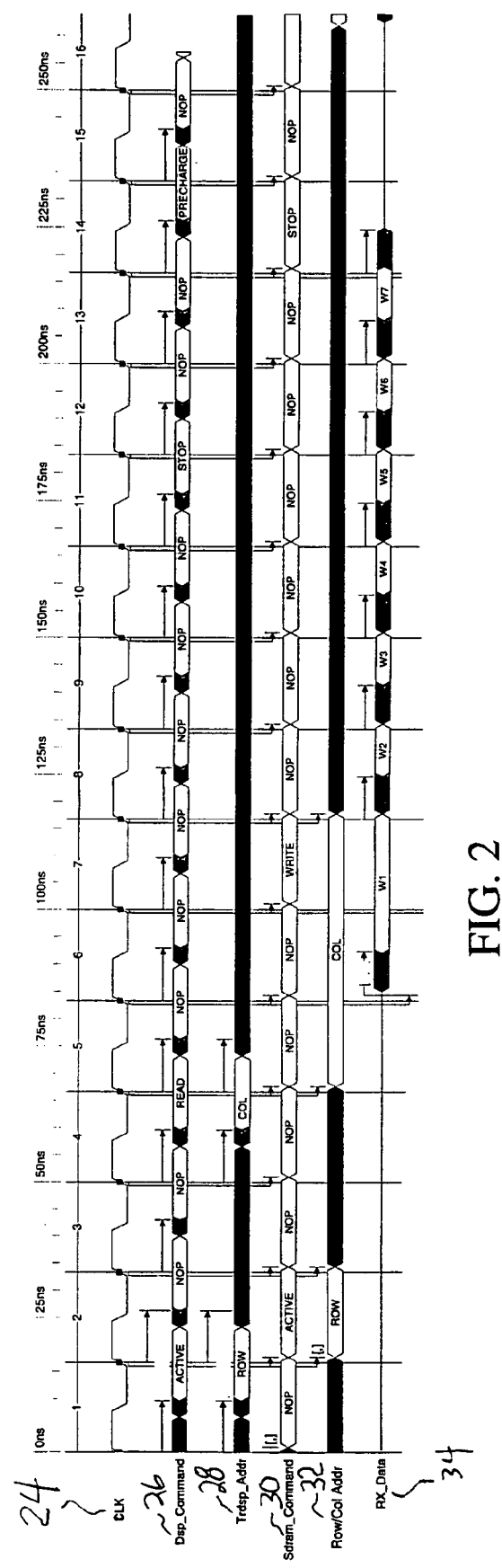
FIG. 2 is a timing diagram of operations according to the invention.

The timing of the data transfer is accomplished by the CPLD via the control lines. A timing chart is illustrated in FIG. 2, wherein representative signals are illustrated.

Three signals from the DSP microprocessor are shown:
Clock 24 (suitably a 60 MHz clock in the illustrated embodiment)
DSP_Command 26 (command signal from the DSP $\mu$P)
Trdsp_Addr 28 (address data supplied by the DSP to select row and column addresses of the SDRAM)

Two SDRAM signals are shown:
Sdram_Command 30 (a command signal to direct the SDRAM operations)
Row/Col Addr 32 (Row and Column selection data to address the SDRAM).

One signal from the MAC is shown:
RX_Data 34 (received data from the MAC FIFO)

Referring still to FIG. 2, the timing of operations are controlled by CPLD 22. Therefore, when an indication that data is available in the FIFO of the MAC (for simplicity, that signal is not shown in the timing diagram), the DSP_Command line is set to ACTIVE during the last half of clock cycle 1 and the Trdsp_Addr is set to the ROW addressing location where data is to be written to in the memory, for a duration of one cycle. Shortly thereafter, at the beginning of clock cycle 2, the Sdram_Command line is set to ACTIVE and the Row/Col Addr line 32 is set to the ROW data for one cycle. Afterwards, Sdram_Command is set to NOP until a change at cycle 7. In the middle of clock cycle 4, (2 clock cycles after the end of the ROW data on the Trdsp_Addr line) the Dsp_Command is set to READ (indicating a read) and the Trdspp_Addr is set to carry the column selection COL indicating the column of memory to be selected in the SDRAM, both signals for 1 clock cycle duration. One half clock cycle later, at the beginning of clock cycle 5, the COL data is asserted on the Row/Col Addr line for 3 clocks. Soon after cycle 6 starts, the MAC RX_Data will begin on line 34 carrying the first word of data W1, the data W1 remaining until the end of cycle 7. At the start of cycle 7, Sdram_Command is set to WRITE for one clock. After Cycle 8 starts, Sdram_Command is set to NOP until cycle 14. The RX_Data line will subsequently carry valid data from the MAC for next words W2, W3, W4, W5, W6 and W7 during the last half of clocks 9–13, respectively. During the last half of clock 11, a STOP command is set on Dsp_Command line 26. After the start of clock cycle 14, a STOP appears on Sdram_Command line 30, finishing the write to memory operation.

The timing control described hereinabove is accomplished by the CPLD 22, to provide timing signals and direct data to appear on the respective lines so that the SDRAM is provided the data according to the timing requirements it has, the MAC is able to write its data to the bus according to the timing requirements of the MAC, and the DSP is able to read the data under its timing requirements. Also, addressing, which is not provided by the MAC (since it is a FIFO device), is generated by the DSP and its timing of assertion is controlled by the CPLD. If, after the data transfer operation described herein, the DSP determines that the data is to be kept, then on the next write to the memory, the ROW and COLUMN addressing would be advanced to the next position in memory for storing data. However, if the data that had been written is not to be kept, then the next write operation will employ the same ROW and COLUMN addressing as the previous write, so that the previous data written to the SDRAM is discarded, as a result of being written over with new data.

The CPLD makes the decision of whether to perform the control operations to govern transfer of data from the MAC based on an address range to which the DSP makes read accesses. If the address is in a designated range, the data transfer as above is performed.

Therefore, in accordance with the invention, two or more destination devices are able to receive data from a single source, substantially simultaneously. The devices may be dissimilar, such as a FIFO device not having an addressing scheme and memory or processor devices that do employ addressing. Further, while the bus cycles performed by the DSP, as the master device are read cycles, the SDRAM is operating as if performing write cycles. Transfer of the data from the MAC to both SDRAM and the DSP is thereby accomplished with a single bus transfer.

The system is preferably embodied in a network test instrument, and enables monitoring and processing of network data received through the MAC. Such received data is suitably analyzed and processed by the DSP to provide information and analysis of network operations.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. An apparatus for transferring received data in discrete units from a network, comprising:
   a bus;
   a media access controller for putting ones of discrete units of the received data from the network onto said bus;
   a microprocessor for reading the ones of discrete units of data from said bus;
   a memory for writing the ones of discrete units of data from said bus into said memory; and
   a timing controller for controlling said media access controller, said microprocessor and said memory to have said media access controller write selected ones of discrete units of the data to the bus, said memory write said selected ones of discrete units of the data to said memory and said microprocessor read said selected ones of discrete units of the data substantially simultaneously.

2. An apparatus for transferring received data in discrete units from a network according to claim 1, wherein said apparatus comprises a network test instrument.

3. An apparatus for transferring received data in discrete units from a network according to claim 1, wherein said memory write of the selected quantity of data to said memory and said microprocessor read of the selected quantity of data are accomplished with said selected quantity of data being presented on said bus as a single instance.

4. An apparatus for transferring data, comprising:
   a bus;
   a FIFO data source connected to said bus for putting data onto said bus;
   a microprocessor connected to said bus for reading the data from said bus;
   a memory connected to said bus for writing the data from said bus into said memory; and
   a timing controller connected to said FIFO data source, said microprocessor and said memory for controlling said FIFO data source, said microprocessor and said memory to have said FIFO data source put the data onto the bus, and for a selected quantity of data, have said memory write the selected quantity of data to said memory and said microprocessor read the selected quantity of data substantially simultaneously.

5. A method for operating a network test instrument to transfer data on a bus within said network test instrument from a media access controller at least to a processor and to a memory, separate from said processor, comprising the steps of:
   supplying said data from the media access controller to said processor as a read data operation performed by said processor; and
   supplying said data to said memory as a write operation, wherein said step of supplying data to said processor and said step of supplying data to said memory are accomplished substantially simultaneously with use of the same transfer of said data on said bus.

6. The method for operating a network test instrument according to claim 5, further comprising the steps of:
   determining whether the data currently transferred to said memory is to be retained before a next data is transferred said memory, and if said data currently transferred is to be retained, modifying a next data write address location so that a next data does not overwrite the data currently transferred, and otherwise, if said data currently transferred is not to be retained in said memory, keeping the next data write address as a current data write address value so that the next data is written over the data currently transferred.

* * * * *